US008791979B2

(12) United States Patent
Xue

(10) Patent No.: US 8,791,979 B2
(45) Date of Patent: Jul. 29, 2014

(54) ACCESS METHOD FOR VIDEO CALL AND VIDEO CALL APPARATUS

(75) Inventor: Tao Xue, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 161 days.

(21) Appl. No.: 13/639,238

(22) PCT Filed: Aug. 4, 2010

(86) PCT No.: PCT/CN2010/075706
§ 371 (c)(1),
(2), (4) Date: Oct. 4, 2012

(87) PCT Pub. No.: WO2011/124052
PCT Pub. Date: Oct. 13, 2011

(65) Prior Publication Data
US 2013/0021426 A1   Jan. 24, 2013

(30) Foreign Application Priority Data
Apr. 9, 2010 (CN) .......................... 2010 1 0149117

(51) Int. Cl.
*H04N 7/14* (2006.01)
*H04L 29/06* (2006.01)

(52) U.S. Cl.
CPC ............... *H04N 7/147* (2013.01); *H04L 63/08* (2013.01); *H04L 65/4015* (2013.01)
USPC .................... 348/14.01; 455/410; 379/142.05

(58) Field of Classification Search
USPC .................... 348/14.01, 14.05, 14.07, 14.12; 455/410, 411, 425, 550.1; 379/93.02, 379/93.03, 93.17, 142.05, 142.17
See application file for complete search history.

(56) References Cited

U.S. PATENT DOCUMENTS 8,558,665 B2 *  10/2013  Um et al. ...................... 340/5.74
2003/0043260 A1 *  3/2003  Yap et al. ................... 348/14.06
(Continued)

FOREIGN PATENT DOCUMENTS

CN        1274238 A        11/2000
CN        1885941 A        12/2006
(Continued)

OTHER PUBLICATIONS

Tunji Afonja: "DialByPhoto", Feb. 6, 2009, URL:HTTP://WWW.gx-5.com/products/dialbyphotoforiphone/index_full.php; Updated URL:HTTP://itunes.apple.com/app/dialbyphoto/id302676474?mt=8.*

(Continued)

*Primary Examiner* — Binh Tieu
(74) *Attorney, Agent, or Firm* — Bright IP Law Offices

(57) ABSTRACT

Disclosed in the present invention are an access method for performing a video call and a video call apparatus, wherein the method comprises the steps of: presetting an access password for a video call; after answering the video call, closing audio and video channels, and transmitting a command to a calling terminal for providing an access password for the video call so as to prompt said calling terminal to input an access password associated with the video call; determining if the access password associated with the video call and inputted by said calling terminal matches the preset access password; if so, performing the video call, and if not, refusing said calling terminal's request to perform the video call. According to the technical solution provided by the present invention, the function of automatically selecting whether to answer the video call according to the other party's identity is enabled.

12 Claims, 3 Drawing Sheets

(56) References Cited

U.S. PATENT DOCUMENTS

| | | | |
|---|---|---|---|
| 2005/0277421 A1* | 12/2005 | Ng | 455/445 |
| 2007/0186002 A1* | 8/2007 | Campbell et al. | 709/231 |
| 2013/0102297 A1* | 4/2013 | Chavernac | 455/415 |

FOREIGN PATENT DOCUMENTS

| | | | |
|---|---|---|---|
| CN | 1901707 A | | 1/2007 |
| CN | 1905743 A | | 1/2007 |
| CN | 101056384 A | | 10/2007 |

OTHER PUBLICATIONS

P.R. China, State Intellectual Property Office, International Search Report for International Application No. PCT/CN2010/075706, mailed Jan. 20, 2011.

\* cited by examiner

ACCESS METHOD FOR VIDEO CALL AND VIDEO CALL APPARATUS

CROSS REFERENCE TO RELATED APPLICATIONS

This application is the U.S. National Stage of International Patent Application No. PCT/CN2010/075706 filed on Aug. 4, 2010, which claims priority to Chinese Patent Application No. 201010149117.8 filed on Apr. 9, 2010. Both the PCT Application and Chinese Application are hereby incorporated by reference in their entirety.

FIELD OF THE INVENTION

The present invention relates to the multimedia communication field, and in particular to an access method for video call and a video call apparatus.

BACKGROUND OF THE INVENTION

Video call belongs to multimedia communication field, and is a kind of video conferencing systems having a wide range of application fields, which enables people to see the image of the other party during a call. It is not only applicable for family life, but also can be widely used in various commercial activities, as well as various industry fields of remote teaching, hospital nursing, medical diagnosis, scientific research and so on, therefore it has a very bright market prospects.

During the current video calls, the mobile phone user can only get to know who the calling terminal is after having answered the call, after received an unfamiliar video call, but if the calling terminal is not the one that the called terminal is willing to answer, it is a kind of interruption to the called terminal without any doubt. The existing prompt methods are to answer the call by transmitting a replacement picture, and after having answered the call, if it is the video call required to be answered, the current video will be transmitted then. As to the users, such methods are still somewhat complex, and the process of switching the picture transmitted from video call to the video cannot be finished automatically, thus the user experience is poor.

SUMMARY OF THE INVENTION

The object of the present invention is to provide an access method for performing a video call and a video call apparatus, thus the function of automatically selecting whether to answer the video call according to the other party's identity is enabled.

According to one aspect of the present invention, an access method for a video call is provided, the method comprises the steps of:

presetting an access password for a video call;

after answering the video call, closing audio and video channels, and transmitting a command to a calling terminal for providing an access password for the video call so as to prompt said calling terminal to input an access password associated with the video call;

determining if the access password associated with the video call and inputted by said calling terminal matches the preset access password; if so, performing the video call, and if not, refusing said calling terminal's request to perform the video call.

Preferably, the step of closing the audio and video channels comprises:

closing local audio and video channels; or closing the local audio channel, and transmitting a replacement picture over the video channel; or closing the local video channel, and transmitting a prompt sound over the audio channel.

Preferably, said method further comprises the steps of:

after a match of the two access passwords, opening the audio and video channels to start the video call with said calling terminal.

Preferably, said method further comprises the steps of:

informing the calling terminal of the matching result.

Preferably, the preset access password is provided to said calling terminal via one or more ways of a short message, a multimedia message, a phone call or an Email, or via a User Input Indication (referred as to UII).

According to another aspect of the present invention, a video call apparatus is provided, the video call apparatus comprises:

a presetting module, configured to preset an access password for a video call;

an audio and video control module, configured to close local audio and video channels; or to close the local audio channel, and transmit a replacement picture over the video channel; or to close the local video channel, and transmit a prompt sound over the audio channel;

a transmitting and receiving module, configured to transmit a command to a calling terminal for providing an access password for the video call so as to prompt said calling terminal to input an access password associated with the video call, and to receive the access password of the video call transmitted from said calling terminal; and a matching module, connected with the transmitting and receiving module, configured to determine if the access password of the video call received by said transmitting and receiving module matches the access password of the video call preset by said presetting module, and if so, to perform the video call; otherwise, to refuse said calling terminal's request to perform the video call.

Preferably, said transmitting and receiving module is also configured to transmit the result of matching verification to the calling terminal.

According to yet another aspect of the present invention, an access method for a video call is provided, the method comprises the steps of:

requesting to perform the video call with the called terminal;

after receiving a command prompted by said called terminal for inputting an access password for the video call, inputting an access password provided by said called terminal, and then transmitting the access password to said called terminal for matching verification;

if the matching verification succeeds, performing the video call with said called terminal successfully; and if the matching verification fails, assuming that said called terminal refuses the video call, and terminating the video call request.

Preferably, the above method further comprises: after transmitting the access password to said called terminal for performing the matching verification, receiving the result of the matching verification returned by said called terminal.

According to still another aspect of the present invention, a video call apparatus is further provided, the video call apparatus comprises:

a transmitting and receiving module, configured to transmit a request to perform a video call with a called terminal, and receive a command prompted by said called terminal to input an access password associated with the video call;

an inputting module, configured to input an access password transmitted from said called terminal;

a display module, configured to display a command transmitted by said called terminal for providing an access password of the video call or to display a command including an access password transmitted from the opposite mobile phone for performing a video call, and display whether the access password of the video call is matched successfully or not.

Preferably, said transmitting and receiving module is also configured to transmit the access password to the called terminal for performing the matching verification and then to receive the result of matching verification returned by the called terminal.

Preferably, said display module is also configured to display the result of matching verification for the access password of the video call.

Compared with the traditional art, the present invention enables the function of automatically selecting whether to answer a video call according to the other party's identity by ways of: presetting an access password of the video call; after receiving a video call request, closing the audio and video channels, and transmitting a command to request the access password of the video call from the calling terminal by prompting the calling terminal to input the access password of the video call; then determining if the access password of the video call inputted by the calling terminal matches the preset access password, if so, performing the video call, and if not, refusing the video call request of the calling terminal.

DETAILED DESCRIPTION OF EMBODIMENTS

The present invention will now be described below in detail with particular embodiments and in conjunction with the drawings.

Figure 1:
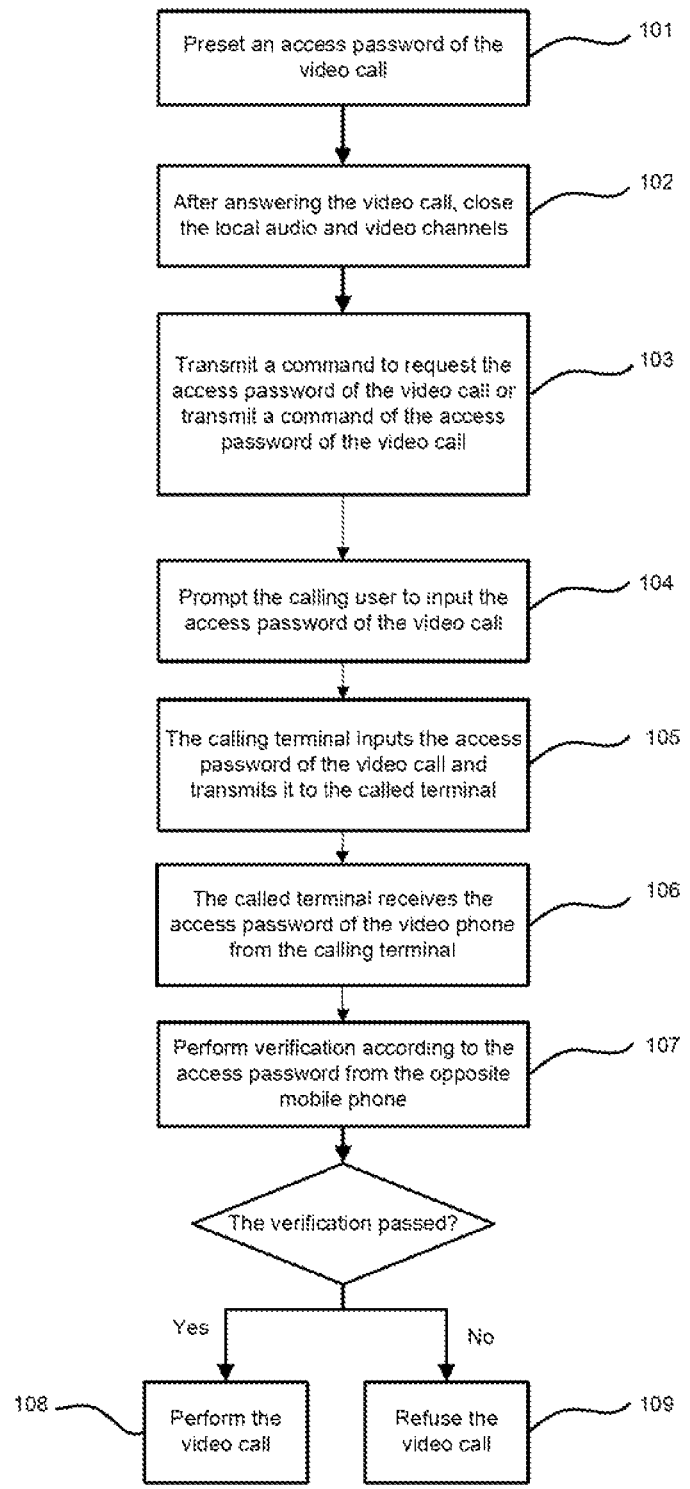
FIG. 1 is a flow chart of an access method for a visual television provided by the embodiment.

Please refer to which is shown in FIG. 1, and FIG. 1 is a flow chart of an access method for a visual television, enabling the function of automatically selecting whether to answer the video call according to the other party's identity, provided by the embodiment, the method mainly comprises the following steps:

Step 101: presets an access password of the video call;

Step 102: a called terminal closes the local audio and video channels after answered the video call;

wherein, to close the local audio and video channels can comprise but not limited to the methods as follows: (1) closing the local audio and video channels; (2) closing the local audio channel and transmitting a replacement picture over the video channel (the replacement picture can be a custom picture or a default picture is used); (3) closing the local video channel, and transmitting a prompt sound over the audio channel (the prompt sound can be a custom prompt sound or a default prompt sound is used);

Step 103: the called terminal transmits a command to request the access password of the video call from the calling terminal;

The calling terminal is notified of the above preset access password of the video call via one or more ways of short messages, multimedia messages, call and Email or by the User Input Indication (referred as to UII) defined in a H.245 message when performing interactive commands.

Step 104: the called terminal prompts the calling user to input the access password of the video call after receiving the command from the calling terminal to request the access password of the video call;

Step 105: the calling user inputs the access password of the video call, and transmits the same to the called terminal;

Step 106: the called terminal receives the access password of the video call transmitted from the calling terminal;

Step 107: the called terminal performs matching operation for the access password of the video call, and transmits the matching result to the calling terminal;

Step 108: if the matching operation succeeds, the local audio and video channels are opened to perform the video call; and Step 109: if the matching operation fails, the video call is terminated.

wherein, the command associated with the matching result of the access password in Step 107 may or may not be transmitted to the calling terminal.

In the embodiment, the above called terminal transmits the command to request the access password of the video call to the calling terminal in a format which is shown in table 1 below:

TABLE 1

| Command Code | Command Name |
| --- | --- |
| REQ_PASS | request the access password of the video Call |
| PASS | access password of the video call |
| CONFIRM_PASS | matching result of the access password of the video call (Match succeeded) |
| ERR_PASS | matching result of the access password of the video call (Match failed) |

The command to request the access password of the video call: REQ_PASS, is used to request the calling terminal to transmit the access password of the video call;

The command of the access password of the video call: PASS, refers to the access password of the video call. The command is relatively complex, that is, by attaching a password to the word "PASS." For example, if the access password of the video call is 123456, the command of this password is PASS:123456.

There are two commands related to the matching result for the access password of the video call:

CONFIRM_PASS, for notifying the calling terminal that the matching result succeeds, and the video call can be performed; ERR_PASS, for notifying the opposite terminal that the matching result fails, the video call cannot be performed;

The aforementioned command to request the access password of the video call, the command of access password of the video call and the command related to the matching result for the access password of the video call can use the User Input Indication (UII) command defined in the H.245 message.

According to the above method, the function of automatically selecting whether to answer the video call according to the other party's identity is enabled.

Figure 2:
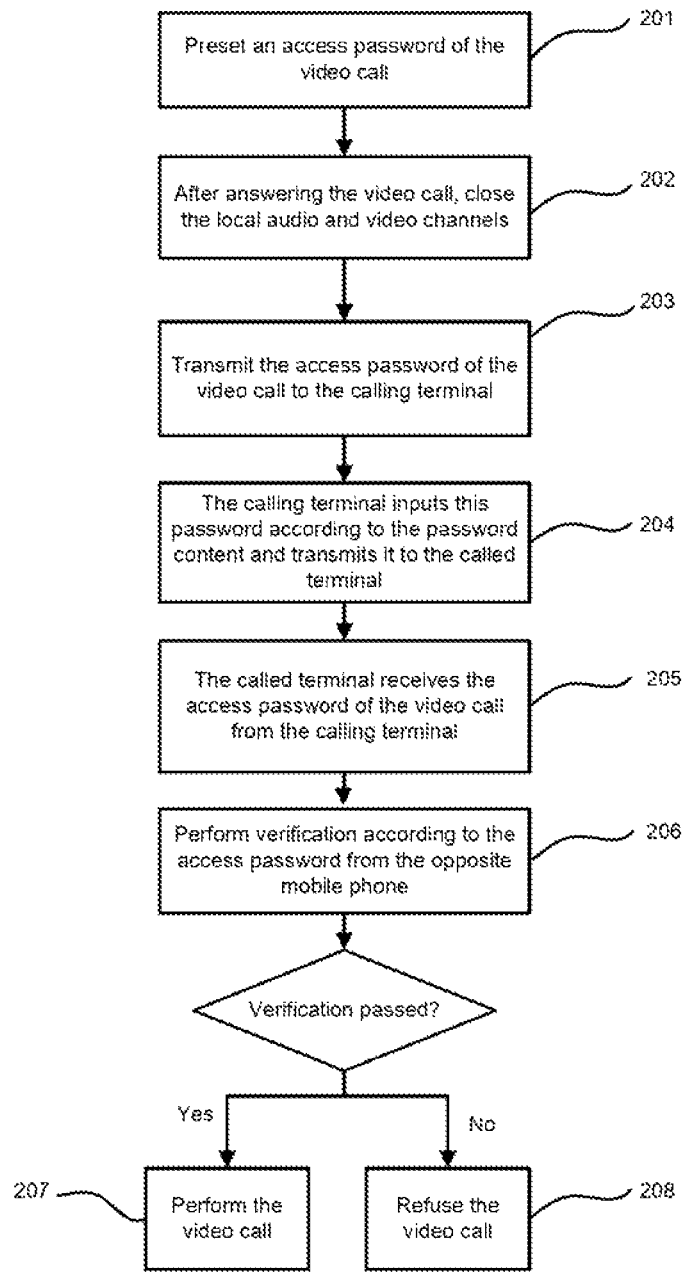
FIG. 2 is a flow chart of another access method for a visual television provided by the embodiment.

Please refer to what is shown in FIG. 2, and FIG. 2 is a flow chart of another access method for a video call provided by the embodiment, and the operation steps thereof comprises:

Step 201: presets an access password of the video call;

Step 202: the called terminal closes the local audio and video channels, after answered the video call;

wherein, to close the local audio and video channels can comprise but not limited to the methods as follows: (1) closing the local audio and video channels; (2) closing the local audio channel and transmitting a replacement picture over the video channel (the replacement picture can be a custom picture or a default picture is used); (3) closing the local video channel, and transmitting a prompt sound over the audio channel (the prompt sound can be a custom prompt sound or a default prompt sound is used);

Step 203: if the called user chooses to answer the video call, it will transmit the access password of the video call to the calling terminal;

wherein, the called user can transmit a temporary password to the calling terminal by inputting a password string; meanwhile, this temporary password can also be set as the access password of the video call, and a preset password can also be transmitted to the calling terminal. The calling terminal is notified of the above access password of the video call by one or more ways of short messages, multimedia messages, call and Email or by the User Input Indication (UII) defined in a H.245 message when performing interactive commands.

Step 204: the calling terminal receives the password transmitted from the called terminal, inputs this password and transmits it to the called terminal;

Step 205: the called terminal receives the access password of the video call transmitted from the calling terminal;

Step 206: the called terminal performs matching operation for the access password of the video call, and transmits the matching result to the calling terminal;

Step 207: if the matching operation succeeds, the local audio and video channels are opened to perform the video call; and Step 208: if the matching operation fails, the video call is terminated;

wherein, the command associated with the matching result of the access password in Step 206 may also not be transmitted to calling terminal.

According to the above method, the function of automatically selecting whether to answer the video call according to the other party's identity is enabled.

Figure 3:
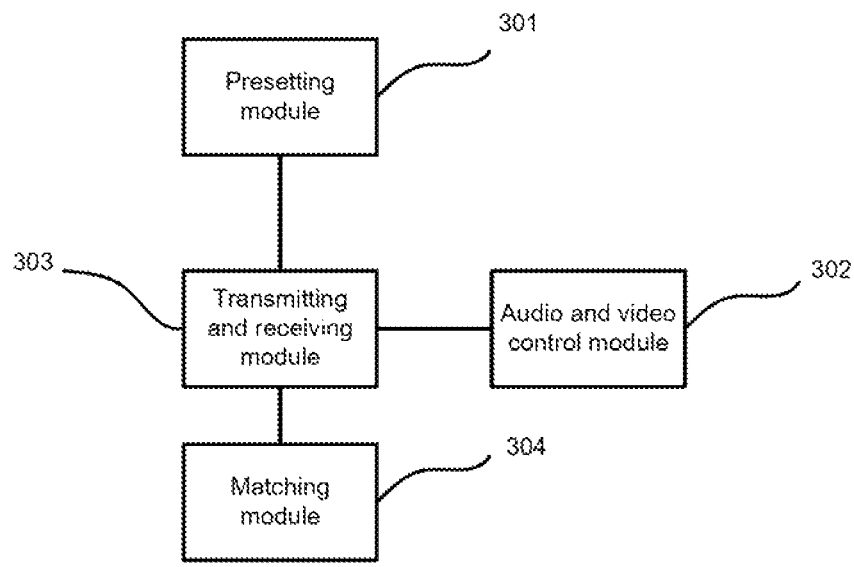
FIG. 3 is a block diagram of a video call apparatus provided by the embodiment of the present invention.

According to the above method, the embodiment further provides a video call apparatus (shown as FIG. 3), which comprises:

a presetting module 301, configured to preset an access password for a video call;

an audio and video control module 302, configured to close local audio and video channels; or to close the local audio channel, and transmit a replacement picture over the video channel; or to close the local video channel, and transmit a prompt sound over the audio channel;

a transmitting and receiving module 303, configured to transmit a command to a calling terminal for providing an access password for the video call so as to prompt said calling terminal to input an access password associated with the video call, and to receive the access password of the video call transmitted from said calling terminal; and a matching module 304, connected with the transmitting and receiving module 303, configured to determine if the access password of the video call received by said transmitting and receiving module matches the access password of the video call preset by said presetting module, and if so, to perform the video call; otherwise, to refuse said calling terminal's request to perform the video call.

The above transmitting and receiving module 303 is also configured to transmit the result of matching verification to the calling terminal.

The above apparatus enables the function of automatically selecting whether to answer the video call according to the other party's identity. Certainly, the above apparatus includes but not limited to various kinds of terminal devices, such as mobile phones, desktop phones and so on.

Figure 4:
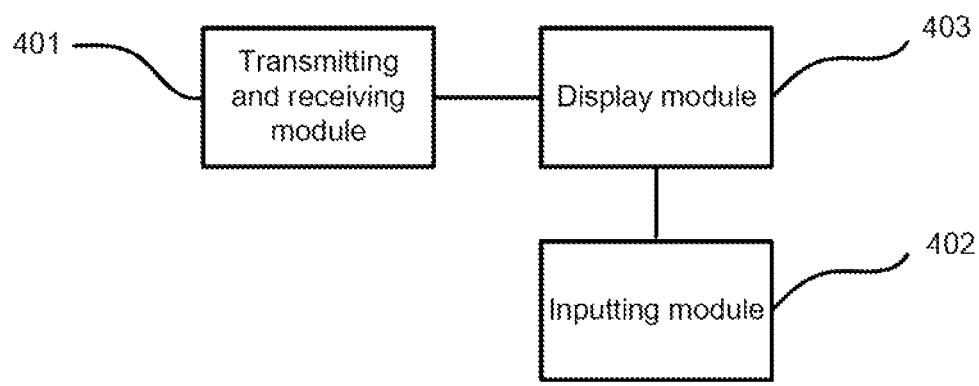
FIG. 4 is a block diagram of another video call apparatus provided by the embodiment of the present invention.

Furthermore, as shown in FIG. 4, the embodiment also provides another video call apparatus, which comprises:

a transmitting and receiving module 401, configured to transmit a request to perform a video call with a called terminal, and receive a command prompted by said called terminal to input an access password associated with the video call;

an inputting module 402, configured to input an access password transmitted from said called terminal; and a display module 403, connected with the transmitting and receiving module 401 and the inputting module 402, configured to display a command transmitted by said called terminal for providing an access password of the video call or to display a command including an access password transmitted from the opposite mobile phone for performing a video call, and display whether the access password of the video call is matched successfully or not.

Said transmitting and receiving module 401 is also configured to transmit the access password to the called terminal for performing the matching verification and then to receive the result of matching verification returned by the called terminal.

Said display module 403 is also configured to display the matching result of the access password of the video call.

The above apparatus enables the function of automatically selecting whether to answer the video call according to the other party's identity. Certainly, the above apparatus includes but not limited to various kinds of terminal devices, such as mobile phones, desktop phones and so on.

The above contents are the further detailed descriptions of the present invention in conjunction with particular embodiments, and cannot determine that the specific implementations of the present invention are only limited to these descriptions. As to those skilled in the art of the present invention, some simple deductions or replacements made, on the premise of not departing from the conceptions of the present invention, shall be regarded in the protection scope of the present invention.

What is claimed is:

1. An access method for a video call, comprising:
   presetting an access password for a video call;
   after answering the video call, closing audio and video channels, and transmitting a command to a calling terminal for providing an access password for the video call so as to prompt said calling terminal to input an access password associated with the video call; and
   determining if the access password associated with the video call and inputted by said calling terminal matches the preset access password; if so, performing the video call, and if not, refusing said calling terminal's request to perform the video call.

2. The method according to claim 1, wherein closing the audio and video channels comprises:
   closing local audio and video channels; or
   closing the local audio channel, and transmitting a replacement picture over the video channel; or
   closing the local video channel, and transmitting a prompt sound over the audio channel.

3. The method according to claim 1, further comprising:
   after a match of the two access passwords, opening the audio and video channels to start the video call with said calling terminal.

4. The method according to claim 1, further comprising:
   informing said calling terminal of the matching result.

5. The method according to claim 1, wherein the preset access password is provided to said calling terminal via one or more ways of a short message, a multimedia message, a phone call or an Email, or via a User Input Indication (UII).

6. A video call apparatus, comprising:
- a presetting module, configured to preset an access password for a video call;
- an audio and video control module, configured to close local audio and video channels; or to close the local audio channel, and transmit a replacement picture over the video channel; or to close the local video channel, and transmit a prompt sound over the audio channel;
- a transmitting and receiving module, configured to transmit a command to a calling terminal for providing an access password for the video call so as to prompt said calling terminal to input an access password associated with the video call, and to receive the access password of the video call transmitted from said calling terminal; and
- a matching module, connected with the transmitting and receiving module, configured to determine if the access password of the video call received by said transmitting and receiving module matches the access password of the video call preset by said presetting module, and if so, to perform the video call; otherwise, to refuse said calling terminal's request to perform the video call.

7. The apparatus according to claim 6, wherein said transmitting and receiving module is also configured to transmit the matching result to said calling terminal.

8. An access method for a video call, comprising:
- requesting to perform the video call with the called terminal;
- after receiving a command prompted by said called terminal for inputting an access password for the video call, inputting an access password provided by said called terminal, and then transmitting the access password to said called terminal for matching verification;
- if the matching verification succeeds, performing the video call with said called terminal successfully; and
- if the matching verification fails, assuming that said called terminal refuses the video call, and terminating the video call request.

9. The method according to claim 8, further comprising: after transmitting the access password to said called terminal for performing the matching verification, receiving the result of the matching verification returned by said called terminal.

10. A video call apparatus, comprising:
- a transmitting and receiving module, configured to transmit a request to perform a video call with a called terminal, and receive a command prompted by said called terminal to input an access password associated with the video call;
- an inputting module, configured to input an access password transmitted from said called terminal; and
- a display module, configured to display a command transmitted by said called terminal for providing an access password of the video call or to display a command including an access password transmitted from the opposite mobile phone for performing a video call, and display whether the access password of the video call is matched successfully or not.

11. The apparatus according to claim 10, wherein said transmitting and receiving module is also configured to receive the result of said matching verification returned by the called terminal, after transmitting the access password to the called terminal for performing the matching verification.

12. The apparatus according to claim 11, wherein said display module is also configured to display the result of said matching verification for the access password of the video call.

\* \* \* \* \*